United States Patent [19]

Prunty

[11] 4,388,263
[45] Jun. 14, 1983

[54] CONTROLLED ELASTOMERIC TOOLING FOR PLASTIC FABRICATION

[75] Inventor: John Prunty, San Diego, Calif.

[73] Assignee: General Dynamics Corp./Convair Division, San Diego, Calif.

[21] Appl. No.: 311,102

[22] Filed: Oct. 13, 1981

[51] Int. Cl.³ .......................... B29D 3/02; B29C 1/12; B29C 1/02
[52] U.S. Cl. .................................... 264/257; 249/127; 264/137; 264/313; 425/406; 425/DIG. 14; 425/DIG. 44
[58] Field of Search ............... 264/257, 337, 258, 338, 264/313, 314; 425/DIG. 44, 440, 547, 417, 457, 425/DIG. 14, 406, 407, 384, 385; 100/93 P, 295, 100/211; 249/127

[56] References Cited

U.S. PATENT DOCUMENTS

| 248,322 | 10/1881 | Jacobs | 100/295 |
|---|---|---|---|
| 260,083 | 6/1882 | Bowker | 100/257 |
| 374,748 | 12/1887 | Netter et al. | 100/257 |
| 457,482 | 8/1891 | Royle et al. | 425/192 |
| 2,714,226 | 8/1955 | Axelrad | 264/337 |
| 3,204,550 | 9/1965 | Swiderski et al. | 100/295 |
| 3,284,858 | 11/1966 | Taccone | 100/211 |
| 3,295,559 | 3/1967 | Horn et al. | 264/313 |
| 3,546,221 | 12/1970 | Johnson | 264/249 |
| 4,111,024 | 9/1978 | Dahlman et al. | 100/211 |
| 4,133,626 | 1/1979 | Schubart | 425/417 |
| 4,167,430 | 9/1979 | Arachi | 264/313 |

FOREIGN PATENT DOCUMENTS

| 197803 | 3/1978 | Fed. Rep. of Germany | 425/385 |
|---|---|---|---|
| 1060296 | 5/1954 | France | 100/211 |
| 54-43961 | 4/1979 | Japan | 425/440 |

Primary Examiner—Willard E. Hoag
Attorney, Agent, or Firm—John R. Duncan

[57] ABSTRACT

Fiber reinforced thermoplastic resin composites are molded and cured in a system using controlled elastomeric tooling to apply molding pressure only after temperature has been increased to a selected point. A composite material to be molded and cured is typically placed between a fixed mold surface and a movable reaction block. A container is mounted on a fixed support behind the block in a manner permitting movement toward the block. The container has an interior base generally parallel to the block and an upstanding edge extending toward the block. A pad of an elastomeric material having a positive coefficient of thermal expansion is retained in the container by the edges. The pad extends beyond the edges into contact with the block. A gap of selected size lies between the pad and the container base. As the assembly is heated during molding, the pad expands into the gap without exerting significant pressure on the block. As heating continues, the gap becomes filled and the pad expands against the block exerting the selected molding pressure at the selected temperature. Adjustment means are provided permitting uniform molding pressures and pressure application temperatures over a large number of pads in complex mold assemblies despite variations in pad dimensions, age, etc.

9 Claims, 6 Drawing Figures

CONTROLLED ELASTOMERIC TOOLING FOR PLASTIC FABRICATION

BACKGROUND OF THE INVENTION

This invention relates in general to the forming of structures from fiber reinforced thermoplastic resins and, more specifically, to such forming using controlled elastomeric tooling.

Recently, light weight, high strength structures fabricated from fiber reinforced thermoplastic resin composites have come into greater use, especially in aircraft, space vehicles and other similar systems. Composites have generally been limited to high value systems and simple structures because of very high fabrication costs.

The composites from which structures are fabricated are mainly available as a fiber fabric or matt and a liquid resin which are to be combined during product fabrication, or in "preforms" in which the fiber fabric or matt is impregnated with the resin in a tacky stage. The resin-impregnated fabric must be laid up in a mold and heated while subjected to uniform pressure to obtain high density in the thermally cured resin. Uniform pressure application has been difficult to obtain in complex mold assemblies, requiring careful mold assembly and adjustment by highly skilled workers.

Attempts have been made to use elastomers having positive coefficients of thermal expansion as the pressure application means. The composite is laid up on rigid mold surfaces, elastomeric blocks are placed against the exposed composite surface and locked in place. Careful design of molds and selection of elastomeric composition and configuration has often provided acceptable results. However, a number of problems remain with this system. As the elastomer ages and goes through a series of molding cycles, its physical characteristics change and the material tends to shrink. This requires regular replacement of the elastomeric components, and continued adjustment and shimming of the mold through succeeding molding cycles.

Also, with the elastomer firmly in contact with the composite, expansion of the elastomer begins as heating begins, so that pressure is immediately applied to the composite, preventing the necessary venting of the volatile agents which the composite outgasses during initial heating. This tends to produce bubbles and weak areas in the final structure. On the other hand, delay in applying pressure beyond the temperature at which curing of the thermosetting resins begins results in inadequate consolidation of the structural member and lower strength.

Thus, there is a continuing need for methods and apparatus for molding and curing structures comprising composite materials.

SUMMARY OF THE INVENTION

The above problems, and others, are overcome by the method and apparatus of this invention in which controlled elastomeric tooling is used for composite structure fabrication. Basically, this novel system uses various combinations, in desired arrangements and configuration, in which a fiber reinforced thermosetting resin composite material is placed in contact with a fixed mold surface, a reaction block is placed on the opposite side of the composite and a controlled elastomeric tool is brought into engagement with the back of the reaction block.

The tool comprises a rigid support means with a container mounted between the support and the reaction block, the container including means for moving the container toward and away from the support (conversely, away and toward the reaction block). The container comprises a base (approximately parallel to the reaction block) having an upstanding edge extending toward the reaction block. An elastomeric pad is retained in said container by said edge. In use, one surface of the pad engages the bearing block and the other surface is spaced a small, carefully selected distance from said base.

In a molding operation, the assembly is heated, typically in an autoclave which provides pressure to other (e.g., broad exterior surfaces) parts of the structure being fabricated and provides the required curing temperature. As heating begins, the pad initially expands into the gap between pad and base without exerting significant pressure on the reaction block. As heating continues, the gap is filled, and the expanding pad presses the reaction block against the composite. Outgassing has been permitted at the lower temperature and the required pressure is applied just before resin curing.

BRIEF DESCRIPTION OF THE DRAWING

Details of the invention, and of preferred embodiments thereof, will be further understood upon reference to the drawing, wherein.

DETAILED DESCRIPTION OF THE INVENTION

Figure 1:
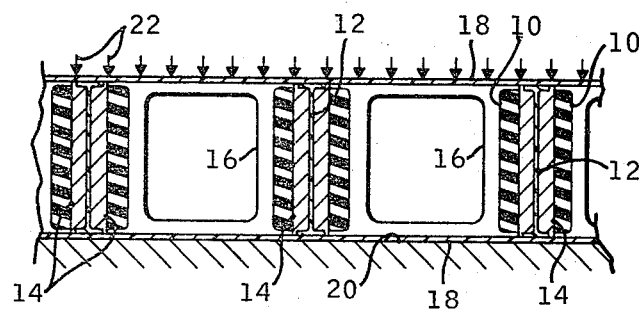
FIG. 1 is a schematic vertical section through a prior art molding apparatus.

Referring now to FIG. 1, there is seen a vertical section through a prior art mold assembly using elastomeric blocks 10 to apply pressure to webs or beams 12 of a fiber reinforced thermosetting resin composite through reaction blocks 14. Fixed mold blocks 16 support the back of elastomeric block 10 and the composite skin sheets 18. Either two reaction blocks 14 on opposite sides of composite beam 12 are used as shown, or one side may be simply a part of a fixed block 16. The bottom of the mold, against which lower skin 18 presses, is formed by base 20. Pressure is applied in the direction of arrows 22 by a vacuum bag (not shown) or other means with the entire assembly in an autoclave to provide both high temperature and pressure.

Under some conditions, the prior art molding apparatus provides acceptable results. However, elastomeric blocks 10 begin to expand immediately upon initiation of heating, and then press reaction blocks 14 tightly against composite beam 12 well before the temperature at which outgassing of volatiles in the resin begins. The trapped gases form voids in the cured structure, seriously lowering its strength.

While one might attempt to simply make elastomeric blocks 10 slightly thinner than usual to delay pressure onset, I have found this to be ineffective. The thickness of the blocks must be very carefully calculated for a specific molding set-up. Also, elastomeric blocks 10, reaction blocks 14 and fixed blocks 16 must be carefully spaced across the mold to produce uniform gaps between elastomeric blocks 10 and adjacent reaction or fixed blocks. This complex set-up is further complicated as the mold assembly is operated through succeeding molding cycles, since the elastomer tend to shrink with continued use.

Figure 2:
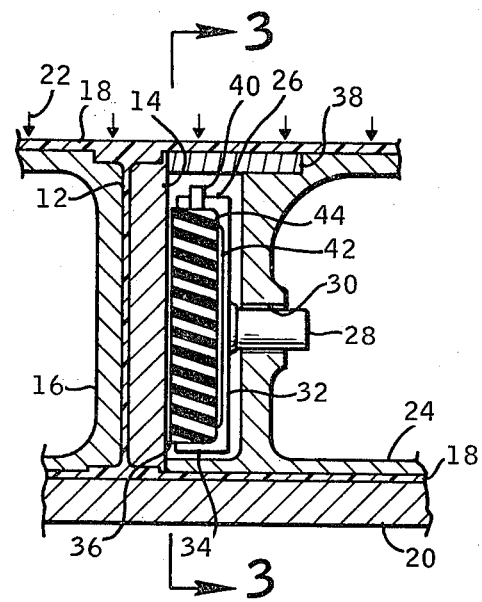
FIG. 2 is a schematic vertical section through the molding apparatus of this invention.
Figure 3:
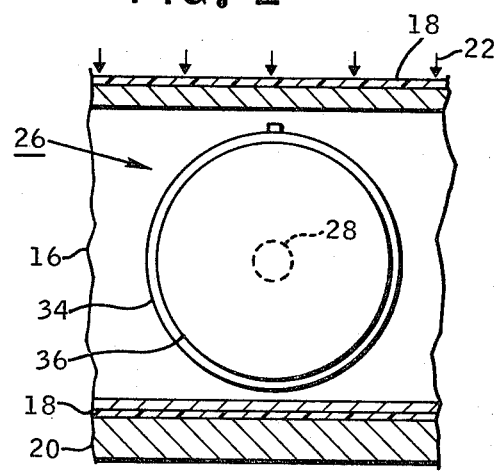
FIG. 3 is a vertical section through the molding apparatus of FIG. 2, taken on line 3—3 in FIG. 2.

These problems are overcome with my controlled elastomeric tooling as illustrated in FIGS. 2 and 3. The arrangement is generally similar to that shown in FIG. 2, with a base 20 serving as the lower mold surface and a conventional vacuum bag (not shown) or the like pressing downward in an autoclave as indicated by arrows 22. Two composite material skins 18 are to be consolidated and joined to a plurality of composite beams 12 (one being shown) to form a large structure. In this embodiment, a fixed block 16 bears against one side of beam 12, with my novel controlled tooling on the other side.

The elastomeric tooling assembly is mounted on a fixed support 24, which may be secured, for example, to base 20 and/or fixed blocks 16 in areas outside the scope of FIGS. 2 and 3. A container 26 is mounted on fixed support 24 by a stud 28 which threads into a threaded opening 30 in fixed support 24. In order to provide for automatic alignment between container 26 and reaction block 14, a universal joint may be interposed between stud 28 and the back of container 26 or the threads between stud 28 and opening 30 may simply be designed for a loose fit.

Container 26 comprises a base portion 32 which is substantially parallel to reaction block 14 and an upstanding edge 34 extending toward reaction block 14. While container 26 is shown as circular in these figures, any suitable shape may be used, as desired.

A pad 36 of elastomeric material having a positive coefficient of thermal expansion is retained in container 26 by edges 34. Since such pads tend to shrink very slightly after a series of mold heating cycles, means may be provided for pressing on the pad to compensate for such shrinkage. A removable plate 38 fastened such as by screws (not shown) to fixed support 24 closes part of the top of the mold assembly and supports part of the undersurface of upper skin 18.

During mold assembly, plate 38 is removed to permit access to container 26 so that it may be rotated to bring pad 36 into contact with the back of reaction block 14. One or more threaded plugs 40 extend through edge 36 and bear against pad 36. A tool inserted through the opening left by removal of plate 38 (such as a screwdriver or Allen wrench) can be used to cause plug 40 to press into pad 36 to compensate for shrinkage.

A uniform gap 42 is formed, such as by machining, into the interior of container base portion 32. Preferably, a shoulder 44 is left around the recess against which pad 36 bottoms when inserted in container 26. The depth of the gap is emperically determined, as further described below, so that pad 36 upon initial heating expands into the gap without exerting appreciable pressure on reaction block 14, then when the selected temperature is reached, the gap is filled and further expansion of pad 36 exerts molding pressure on reaction block 14. Since the assembly is preferably located in an autoclave to provide heating and overall pressure, with the upper skin 18 engaged by a vacuum bag or other pressure means (not shown) all of the composite components are pressed and cured simultaneously. Vacuum bag pressure may be applied at the correct temperature simply by increasing autoclave pressure only when that temperature is reached. Upon completion of curing, the assembly is cooled and the pocket forming tools (fixed blocks 16, fixed supports 24, etc.) are removed by moving them in a direction perpendicular to the paper as seen in FIG. 2 or to the left or right as seen in FIG. 3.

Figure 4:
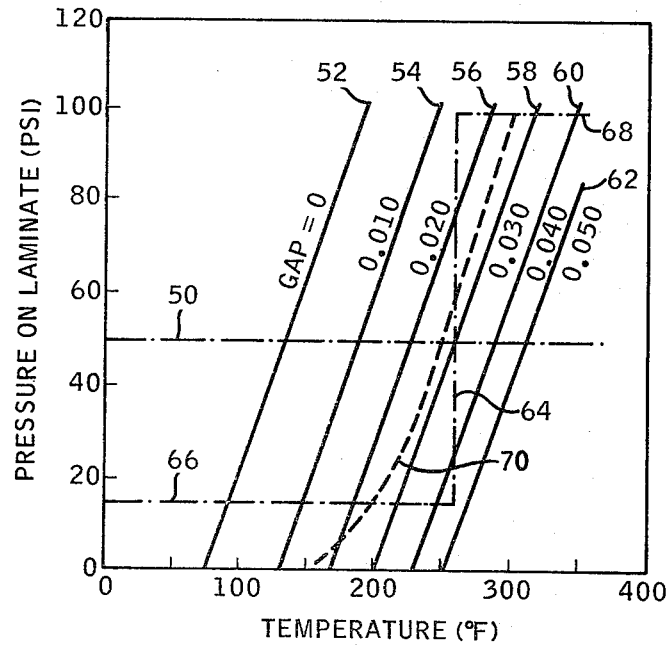
FIG. 4 is diagram plotting molding pressure against temperature for various elastomeric tool configurations.

The effect of the gap 42 described above and of varying its depth are illustrated in FIG. 4. Pressure applied to the composite laminate in beams 12 and the overall composite is plotted against temperature. Emperically, it has been found that to obtain an effective combination of complete outgassing and pressure application before resin curing for a selected resin composition, pressure of about 50 psi (line 50) should be applied at about 260° F.

Where no gap is provided, pressure increase begins immediately as temperature is raised, as indicated by line 52. Here, pressure of 50 psi is reached at about 130° F., well before outgassing is completed, so that bubbles or voids in the composite are likely. Similar theoretical pressure/temperature lines are plotted for progressively greater gaps in lines 54 (0.010 inch gap), 56 (0.101 in), 58 (0.030 in) 60 (0.040 in) and 62 (0.050 in). In theory, assuming the laid-up composite to be incompressible, a gap of 0.030 inches (line 58) should be ideal, giving a pressure of 50 psi at 260° F. At that temperature, the autoclave pressure is rapidly increased along line 64 from ambient pressure (line 66) to about 100 psi (line 68) to provide full consolidation pressure only after outgassing of the composite forming skins 18 is complete.

In practice, however, the composites forming beams 12 do compress somewhat during molding. Actual tests with the given elastomer and composites show that a gap of about 0.015 inch, line 70, provides about 50 psi actual pressure at about 250° F. As shown, line 70 initially curves with increasing temperature as the composite is consolidated, then becomes a straight line upon full consolidation. Thus, whenever a new combination of pad material and composite lay-up is used, a few tests should be performed to determine optimum gap depth, using the theoretical lines as a guide.

Figure 5:
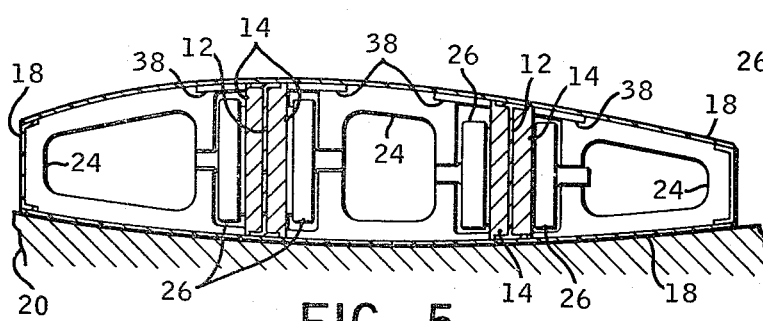
FIG. 5 is a schematic vertical section through a mold assembly for fabrication a wing box.
Figure 6:
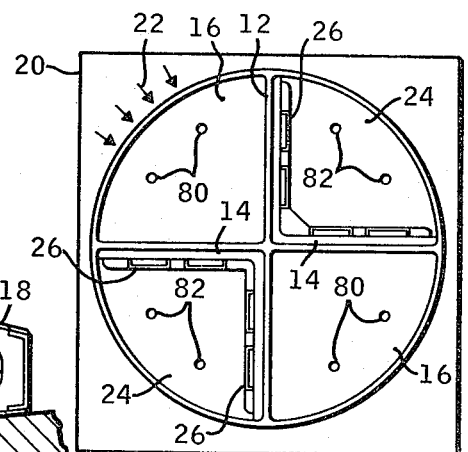
FIG. 6 is a schematic plan view of a mold assembly for a combination cylinder and cruciform structure.

FIGS. 5 and 6 schematically illustrate two other typical mold configurations using the controlled elastomeric tooling of this invention.

FIG. 5 illustrates a wing box structure in which two beams 12 and an overall skin 18 are to be simultaneously molded. The wing box may be molded horizontally as illustrated or vertically, as desired. Here, the lower skin 18 is laid-up against base 20 and center fixed support 24 is installed with assorted container 26 and reaction blocks 14. Beams 12 are laid up, then end fixed supports 24 and associated container 26 and reaction block 14 are installed. The pads are adjusted as discussed above, then plates 38 are installed. The remainder of the composite material forming skin 18 is laid up, then a vacuum bag is placed over the assembly in an autoclave. After heating to the required temperature and application of autoclave pressure, the assembly is cooled, the vacuum bag is removed and the fixed supports and other pocket-forming components are removed.

Another embodiment of the mold assembly is schematically shown in vertical plan view in FIG. 6. Here, a cylinder with an interior cruciform reinforcing beam is to be formed. Two fixed blocks 16 are installed over mounting and aligning pins 80 upstanding from a base. Two fixed supports 24 are similarly installed over aligning pins 82. Each fixed support carries four containers 26 of the sort described above. Composite material to form composite cruciform beam 12 is laid up against fixed blocks 16 and reaction blocks 14 having a generally "L" shape are installed in contact with the composite material. Containers 26 are adjusted to bring their elastomeric pads into contact with the reaction blocks. Composite material which is to form the cylinder wall 18 is applied to the outside of fixed block 16 and fixed supports 24. The assembly is covered with a vacuum bag and is heated and autoclave pressure is applied as described above. After cooling, the vacuum bag is removed and the blocks 16 and supports 24 are lifted out to leave the finished structure.

The following example further provides details of a preferred embodiment of the method of the invention. All parts and percentages are by weight, unless otherwise indicated.

A mold assembly having the overall configuration shown in FIG. 5 is prepared. About 100 parts Dapocast 38-3 silicone rubber is moved with about 6 parts catalyst. The homogeneous mix is vacuum deaerated for about 30 minutes, then is poured into circular aluminum molds that have been coated with a soap release agent. The material is allowed to pre-cure for about 2 days at room temperature, then is cured in a press at a pressure of about 50 psi for about 3 hours at about 150° F. The rubber pads are removed from the molds and post cured for about 4 hours at about 250° F., then for about 8 hours at about 375° F. Tests were made of the expansion characteristics of the pads between room temperature and about 350° F. The expansion of this material is plotted in line 52 of FIG. 4.

The composite material to be molded is Regidite 5208/T300 graphite/epoxy prepreg from Narmco. The mold tools which contact the composite are degreased and coated with Frekote 33 release agent, then are heated to about 350° F. for about one hour to assure clean release of cured laminate.

The prepreg is laid up on the mold to form the beams and skin by preapplying each ply and precompacting after laying up four plies. One ply of 181 glass and full vacuum at about 170° F. for 20 minutes were used to bleed compact each ply. Lay up continues until 16 sheets of prepreg are in place.

The assembly is moved into an autoclave and a vacuum bag is installed thereover. Full vacuum pressure (about one atmosphere) is applied and temperature is increased to about 225° F. at about 0.75° F. per minute and then held at about 225° F. for about 30 minutes. Pressure is increased to about 35 psi and the temperature is increased at about 1° F. per minute. Finally, as temperature reaches about 300° F., 100 psi is applied. Temperature is further increased to about 350° F. and the part is cured for about 90 minutes.

The assembly is then removed from the autoclave, the vacuum bag is removed and the internal, pocket-forming, mold components are removed. A structure with no voids or bubbles, having excellent physical properties results.

While certain specific components, arrangements, materials and process variables were shown and described in conjunction with the above description of preferred embodiments, these can be varied, where suitable, with similar results. Other variations, applications and ramifications of this invention will occur to those skilled in the art upon reading this disclosure. Those are intended to be included within the scope of this invention, as defined in the appended claims.

I claim:

1. The method of applying pressure to a composite material through thermal expansion of an elastomeric pad which comprises the steps of:

arranging said material between mold surfaces, at least one of which comprises a movable reaction block;

positioning a pressure application means adjacent to said reaction block, said pressure application means comprising a container having a base and an upstanding edge extending toward said reaction block and an elastomeric pad spaced a selected distance from said base and retained by said edges; to provide a gap between said pad and the container base adjusting said reaction block and pad so that said block is in aligned contact with said material and said pad is in contact with the opposite side of said reaction block, by rotating a loosely fitting threaded mounting means between said reaction block and a fixed support therefor and, heating said assembly to the curing temperature of said material;

whereby said pad expands into said gap during initial heating without exerting significant pressure on said block, then when said gap is filled exerts selected pressure on said block as temperature is further increased.

2. Apparatus for molding fiber reinforced thermoplastic resin composite components using controlled elastomeric tooling which comprises:

fixed mold means for engaging at least a portion of composite material to be shaped and cured;

support structure adjacent to said fixed mold means adapted to receive said material therebetween;

at least one pad container mounted on said support structure for movement toward and away from said material, said container including an interior base surrounded by an upstanding edge;

a pad of elastomeric material having a positive coefficient of thermal expansion mounted in said container parallel to said base and retained by said edge;

reaction blocks between said pads and material, adapted to contact said material on one side and said pad on the other;

said pad mounted in said container with a selected gap between said pad and container base;

whereby as said apparatus is heated said pad initially expands to fill said gap without exerting significant pressure on said material through said reaction block, then continues to expand to exert pressure on said material with further heating beyond the temperature at which said gap is filled.

3. Molding Apparatus Comprising:

first and second mold surfaces adapted to receive self sustaining composite material therebetween;

at least one of said mold surfaces comprising a movable reaction block;

a fixed support means behind each reaction block;

at least one container mounted on each fixed support by a mounting means for movement toward and away from the adjacent reaction block;

said mounting means comprising a stud extending from the back of said container threadedly engaging said fixed support, said threaded engagement being sufficiently loose to permit said pad to be substantially self-aligning with said reaction block;

each said container comprising an internal base substantially parallel to said reaction block and an upstanding edge surrounding said base and extending toward said adjacent reaction block; and a pad of elastomeric material having a positive coefficient of expansion secured in each said container and adapted to contact said adjacent reaction block and exert pressure thereagainst when heated;

said pad retained in said container by said upstanding edge and spaced a selected distance from the base of said container to provide a gap therebetween;

whereby upon heating said pads initially expand to fill gaps and then continue to expand and exerts pressure against said reaction blocks to initiate molding pressure on said materials through said reaction block only when a selected elevated temperature is reached.

4. The apparatus according to claim 3 wherein said pad is substantially disk shaped and said edge is circular.

5. The apparatus according to claim 3 further including at least one plug threaded into said edge approximately parallel to said base, said plug adapted to being threaded inwardly against said pad to compensate for minor pad shrinkage.

6. In an apparatus for forming and curing composite materials which includes fixed mold structure adapted to contact at least some portions of said material and movable mold structures adapted to contact at least some other portions and pressure applying means comprising an elastomeric material having a positive coefficient of expansion positioned between the back of said movable structure and a fixed support to press said movable structure against said material during heating of the apparatus to the curing temperature of the composite; the improvement wherein:

said pressure applying means further comprises a container mounted on said fixed support having a base surrounded by an upstanding edge extending toward said movable structure, an elastomeric pad in said container spaced a selected distance from said base and retained by said edges, and means permitting selected movement of said container toward and away from said movable structure to bring said pad into contact with said movable structure said means for permitting selected movement comprising a stud on the back of said container loosely threaded into said fixed support to permit said container to be moved toward and away from said movable structure by rotation of said stud while permitting said container to be self-aligning with said movable structure.

7. The improvement according to claim 6 further including a shoulder on said base adjacent to said edge to hold said pad a selected distance from said base across most of said base.

8. The improvement according to claim 6 wherein at least some of said movable mold structures are arranged to sandwich portions of said material therebetween.

9. The improvement according to claim 6 further including adjustment means extending through said upstanding edge movable toward away from pressing engagement with said elastomeric pad.

* * * * *